(12) United States Patent
Scott, III et al.

(10) Patent No.: US 7,636,300 B2
(45) Date of Patent: Dec. 22, 2009

(54) PHONE-BASED REMOTE MEDIA SYSTEM INTERACTION

(75) Inventors: Samuel Thomas Scott, III, Los Gatos, CA (US); John R Mick, Jr., Sunnyvale, CA (US)

(73) Assignee: Microsoft Corporation, Redmond, WA (US)

(*) Notice: Subject to any disclaimer, the term of this patent is extended or adjusted under 35 U.S.C. 154(b) by 692 days.

(21) Appl. No.: 11/100,758

(22) Filed: Apr. 7, 2005

(65) Prior Publication Data

US 2006/0227761 A1    Oct. 12, 2006

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .................. 370/217; 370/352; 370/486; 370/487; 455/3.03; 455/419; 725/62; 725/69

(58) Field of Classification Search .................. 370/217, 370/264, 352, 486, 487, 3.5; 455/3.03–3.06, 455/419, 420; 725/62, 99; 709/231; 379/88.22, 379/102.01
See application file for complete search history.

(56) References Cited

U.S. PATENT DOCUMENTS

| | | | |
|---|---|---|---|
| 2003/0198461 A1* | 10/2003 | Taylor et al. | 386/83 |
| 2003/0212708 A1* | 11/2003 | Potrebic et al. | 707/104.1 |
| 2004/0078817 A1* | 4/2004 | Horowitz et al. | 725/58 |
| 2005/0027539 A1* | 2/2005 | Weber et al. | 704/275 |

* cited by examiner

*Primary Examiner*—Matthew D Anderson
*Assistant Examiner*—Shaima Q Aminzay
(74) *Attorney, Agent, or Firm*—Lee & Hayes, PLLC

(57) ABSTRACT

Phone-based remote media system interaction is described. A content distribution system provides a telephone-based voice menu system that enables a caller to select a media system control command. The content distribution system then causes the media system control command to be executed in association with a remote media system associated with, or specified by, the caller.

20 Claims, 10 Drawing Sheets

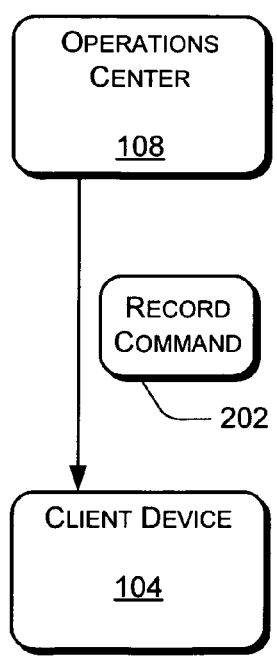
Figure 2

PHONE-BASED REMOTE MEDIA SYSTEM INTERACTION

TECHNICAL FIELD

This invention relates to media systems, and more specifically to remote media system interaction.

BACKGROUND

Many existing entertainment systems include digital video recorder technology, allowing users to digitally record media content, such as broadcast television programs. Users typically schedule programs to be recorded using a remote control device to interact with a user interface that is presented via a television screen. More advanced systems may also allow a user to schedule programs to be recorded via a web-based interface using a personal computer.

While these implementations work well when a user is at home with access to the DVR interface or somewhere else with access to an Internet connection (e.g., at work), there may be other times that a user may wish to schedule a program to be recorded, but is neither at home, nor has access to the Internet. For example, a user may get caught in traffic while driving home from work, meaning that the user won't get home in time to watch their favorite program. Accordingly, there is a need for an alternative way in which a user can schedule a program to be recorded, particularly when the user is not at home to schedule the program.

SUMMARY

Phone-based remote media system interaction is described. A content distribution system configured to transmit media content to remote media systems via a media network is also configured to provide a voice menu system accessible via a telephone network. A user may place a phone call to access the voice menu system, and through the voice menu system may retrieve data associated with a remote media system. Retrieved data may include, for example, a list of programs that have been recorded, a list of programs that are scheduled to be recorded, a list of programs that are scheduled for broadcast, and so on. The voice menu system may also enable the user to enter control commands to be forwarded to the remote media system. Control commands may include, for example, a record command that specifies a particular upcoming broadcast program to be recorded.

The voice menu system may also enable the user to forward a control command to a remote media system associated with another user. For example, a user may identify an upcoming program that may be of interest to a friend, and request that a record command for the upcoming program be forwarded to a remote media system associated with the friend. The content distribution system may verify that the remote media system is available before transmitting the control command. If the remote media system is unavailable, the content distribution system may store the control command to be transmitted at a later time.

The voice menu system may also enable a user to provide access to a program available through the user's remote media system to another user. For example, the user may request that a previously recorded program be copied from the user's remote media system to a friend's remote media system. Alternatively, the user may request that the friend's remote media system be given access to the program that is recorded and stored on the user's remote media system.

BRIEF DESCRIPTION OF THE DRAWINGS

FIG. 2 is a pictorial diagram that illustrates exemplary communications between a user, an operations center, and a client device according to an exemplary implementation of phone-based remote media system interaction.

DETAILED DESCRIPTION

The embodiments of phone-based remote media system interaction described below enable a user to indirectly interact with an entertainment system. A voice menu system allows a user to review the status of current and scheduled recordings. The system also provides voice recognition to allow a user to search for upcoming programs and to schedule those programs to be recorded.

The voice menu system may also enable a user to send a command to an entertainment system associated with another user. For example, a user may identify an upcoming program that he thinks his friend would like to watch. The user may then, through the voice mail system, forward a record command for that program to his friend. The system notifies the friend of the received command, and gives the friend the option to accept or reject the command. If the friend accepts the command, then the friend's entertainment system is scheduled to record the program.

The voice menu system may also enable a user to provide a friend access to a program that has been previously recorded using the user's entertainment system. For example, a user may be talking to his friend about a program that he recorded the night before, and the friend may express interest in watching the program. The user may then place a phone call to the voice menu system and request that the previously recorded program be forwarded to the friend.

The following discussion is directed to phone-based remote media system interaction. While features of phone-based remote media system interaction can be implemented in any number of different computing environments, they are described in the context of the following exemplary implementations.

Figure 1:
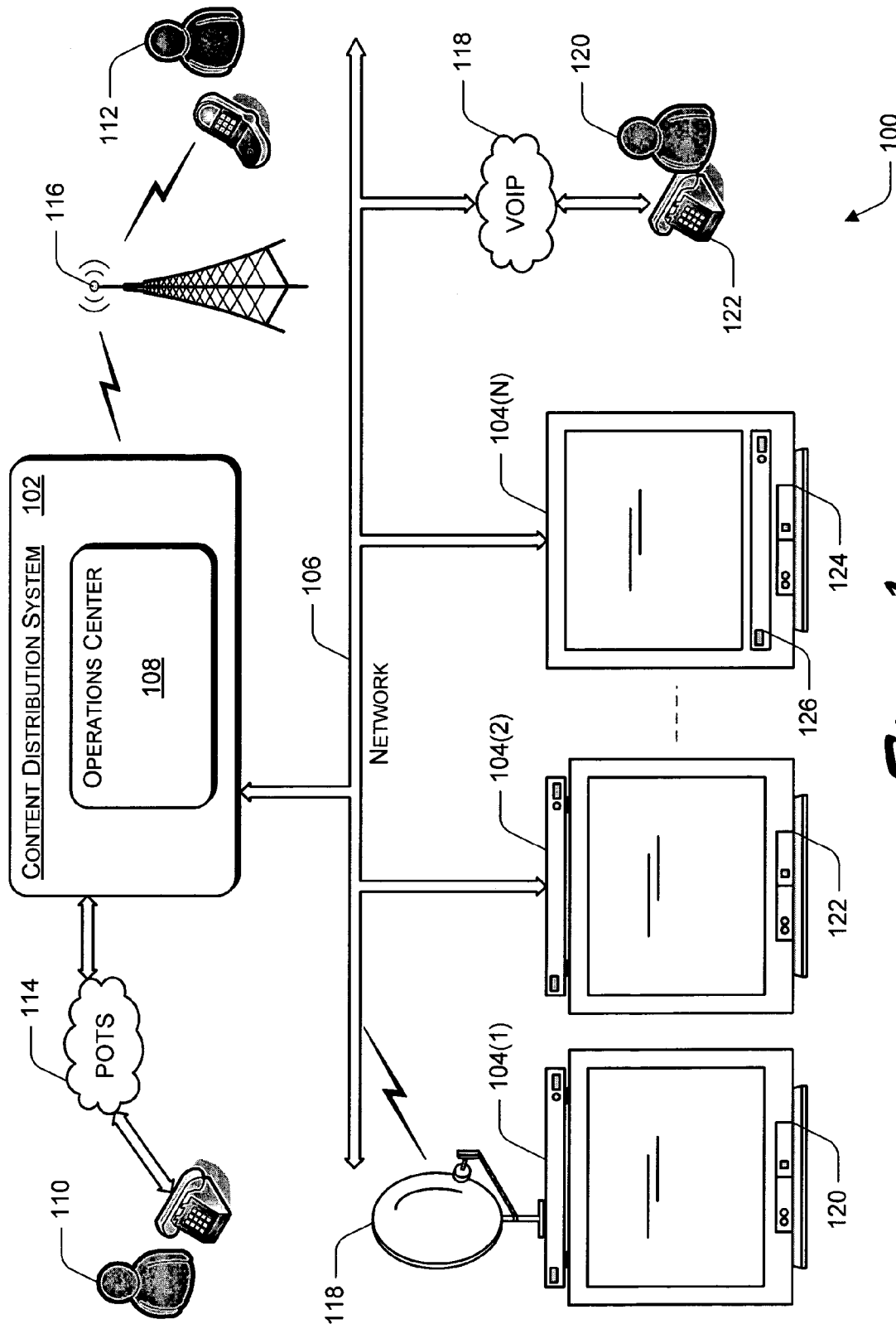
FIG. 1 is a pictorial diagram that illustrates an exemplary environment in which phone-based remote media system interaction may be implemented.

FIG. 1 illustrates an exemplary network environment 100 in which phone-based remote media system interaction may be implemented. Exemplary environment 100 is a media entertainment system that facilitates distribution of media content to multiple users. The environment 100 includes content distribution system 102, and multiple client devices 104(1), 104(2), ..., 104(N) coupled to the content distribution system 102 via a network 106.

Content distribution system 102 transmits data and media content to the multiple client devices 104(1), 104(2), ..., 104(N) via network 106. Network 106 can include an IP-based network (e.g., the Internet), a voice-over IP (VOIP) network, cable television network, RF, microwave, satellite, and/or data network, and may also support wired or wireless media using any format and/or protocol, such as broadcast, unicast, or multicast. Additionally, network 106 can be any type of network, using any type of network topology and any network communication protocol, and can be represented or otherwise implemented as a combination of two or more networks.

In the described exemplary implementation, content distribution system 102 includes operations center 108, which enables users 110 and 112 to interact with content distribution system 102 via a plain old telephone system (POTS) 114 and/or a cellular telephone system 116. If network 106 is implemented to include a VOIP network 118, then user 120 may interact with content distribution system 102 using a communication device 122 that supports voice communication. In this illustrated example, communication device 120 is illustrated as a telephone. In an alternate implementation, communication device 120 may be implemented as a personal computer that includes a microphone and a speaker, thereby enabling voice communication over VOIP network 118. Select components of an exemplary content distribution system 102 are described in further detail below with reference to FIG. 3.

Client devices 104 can be implemented in any number of ways. For example, a client device 104(1) receives content from a satellite-based transmitter via a satellite dish 118. Client device 104(1) is also referred to as a set-top box or a satellite receiving device. Client device 104(1) is coupled to a television 120 for presenting the media content received by the client device (e.g., audio and/or video data), as well as a graphical user interface. A particular client device 104 can be coupled to any number of televisions and/or similar devices that can be implemented to display or otherwise render content. Similarly, any number of client devices 104 can be coupled to a television. For example, a personal computer may be implemented as an additional client device capable of receiving data and/or media content and communicating with a set-top box, television, or other type of display device.

Client device 104(2) is also coupled to receive content from network 106 and provide the received content to associated television 122. Client device 104(N) is an example of a combination television 124 and integrated set-top box 126. In this example, the various components and functionality of the set-top box are incorporated into the television, rather than using two separate devices. The set-top box incorporated into the television may receive signals via a satellite dish (similar to satellite dish 118) and/or via network 106. In alternate implementations, client devices 104 may receive signals via the Internet or any other medium (e.g., broadcast, unicast, or multicast).

FIG. 2 illustrates an example communication 200 between user 112 and operations center 108. In the illustrated example, the user logs into the operations center 108 via a telephone, by entering, for example, a subscriber ID and a passcode. The user then navigates a voice menu system provided by operations center 108 by entering voice and/or touchtone commands via the telephone. In the illustrated example, the user uses the voice menu system to identify a program the user would like to record. Based on the user selection, operations center 108 generates a record command 202 and transmits the record command to the user's client device 104, thereby scheduling the user's entertainment system to record the selected program.

Figure 3:
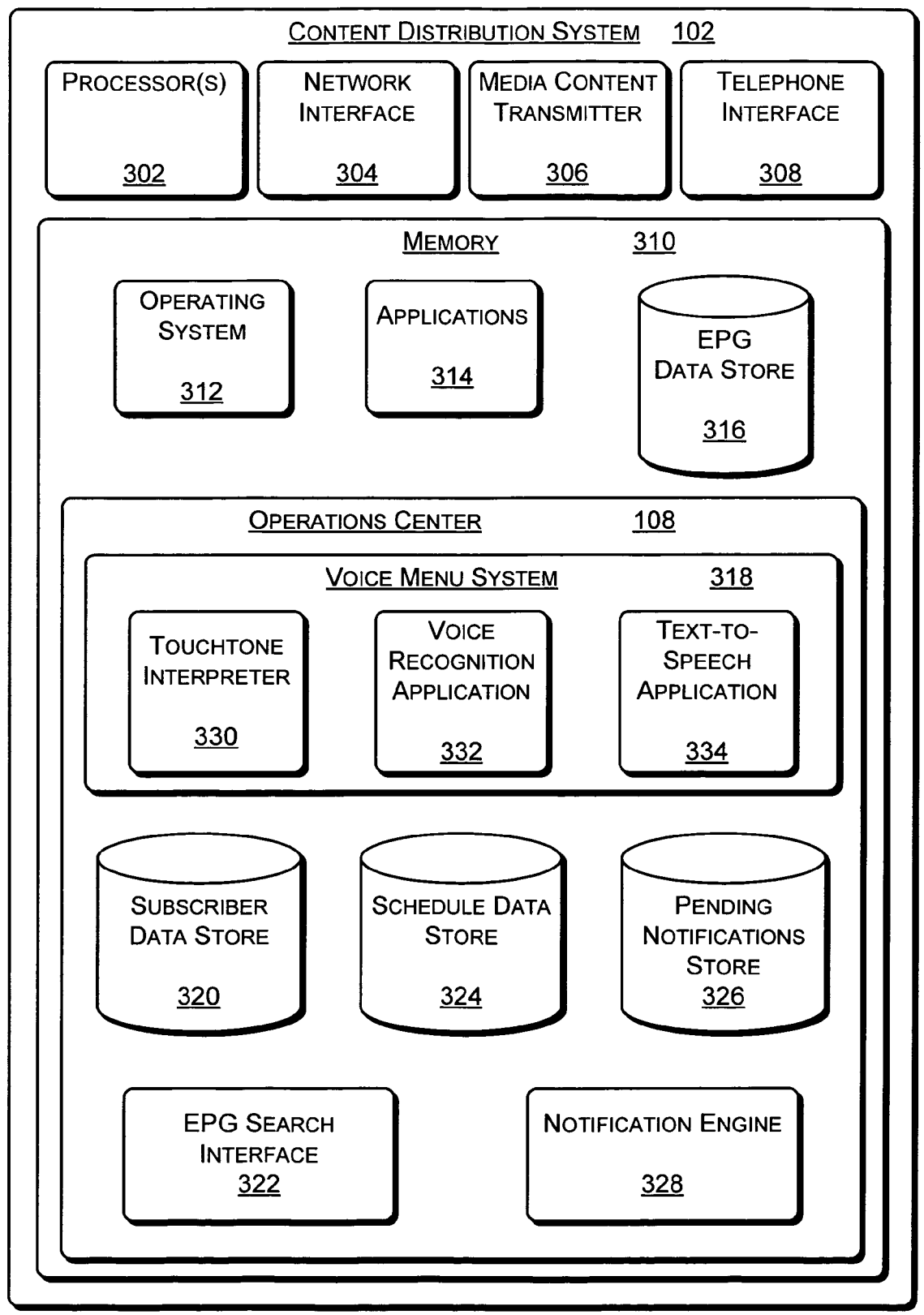
FIG. 3 is a block diagram that illustrates select components of an exemplary content distribution system configured to support phone-based remote media system interaction.

FIG. 3 illustrates select components of an exemplary content distribution system 102, configured to support phone-based remote media system interaction. Content distribution system 102 includes one or more processors 302, network interface 304, media content transmitter 306, telephone interface 308, and memory 310.

Network interface 304 enables communication between content distribution system 102 and other computer systems, such as client systems 104, via a network 106 such as the Internet. Media content transmitter 306 transmits media content and other data (e.g., electronic program guide data, data requests, control commands, and so on) over the network to the client devices. Telephone interface 308 enables communication between content distribution system 102 and a user via a telephone network, such as a POTS 114 or a wireless (e.g., cellular) telephone network 116.

Operating system 312, other applications 314, electronic program guide (EPG) data store 316, and operations center 108 are stored in memory 310 and executed on processor(s) 302. EPG data store 316 maintains programming data that may be transmitted to one or more client devices to support an electronic program guide application. As an example, EPG data store 316 may store data that identifies programs scheduled to be broadcast in the future (e.g., within the next two weeks).

Components of operations center 108 may include, but are not limited to, voice menu system 318, subscriber data store 320, EPG search interface 322, schedule data store 324, pending notifications store 326, and notification engine 328. Voice menu system 320 provides an audible, interactive menu in response to which voice and/or touchtone commands may be received. Voice menu system 318 includes a touchtone interpreter 330, a voice recognition application 332, and a text-to-speech application 334. Touchtone interpreter 330 is configured to convert touchtone data received from a telephone to textual data. Similarly, voice recognition application 332 is configured to convert spoken data received from a telephone to textual data. Text-to-speech application 334 is configured to convert textual data to speech that can then be transmitted via a telephone connection. Touchtone interpreter 330, voice recognition application 332, and text-to-speech application 334 are examples of components that are well-known to those skilled in the art and can be found in many existing automated voice menu systems.

Subscriber data store 320 maintains data associated with media system subscriptions that are serviced by content distribution system 102. For example, for each subscriber, subscriber data store 320 may maintain a subscriber ID, a passcode, and a client device ID. When a user contacts content distribution system 102 by telephone, voice menu system 318 verifies the user's identity by requesting that the user enter their subscriber ID and passcode. These values are then verified using data stored in subscriber data store 320.

EPG search interface 322 enables communication between voice menu system 318 and EPG data store 316. For example, if voice menu system 318 receives a search command and a program name, then voice menu system 318 may call EPG search interface 322 to query EPG data store 316 for any existing EPG data associated with the received program name.

Schedule data store 324 maintains data identifying programs that have been recorded or are scheduled to be recorded. For example, for each subscriber, a list of previously recorded (and still available) programs and scheduled programs may be maintained. In an exemplary implementation, this data may be maintained by querying a client device associated with the subscriber via the network. Alternatively, the client device may be configured to send updated schedule data to the server, either periodically, or whenever the client device schedule data changes (e.g., a previously recorded program is deleted, a program is recorded, or a program is scheduled to be recorded).

Voice menu system 318 adds data to pending notifications store 326 as control commands are received from a user via a telephone. For example, when a user requests through voice menu system 318 that a particular program be recorded, a notification is generated. The notification is addressed to a client device associated with the subscriber and includes data that indicates that the user-selected program is to be recorded.

Notification engine 328 identifies notifications in pending notification store 326 and transmits the notifications to the specified client devices. In an exemplary implementation, notification engine 328 verifies that a notification has been successfully received by the client device before deleting the notification from pending notification store 326.

Figure 4:
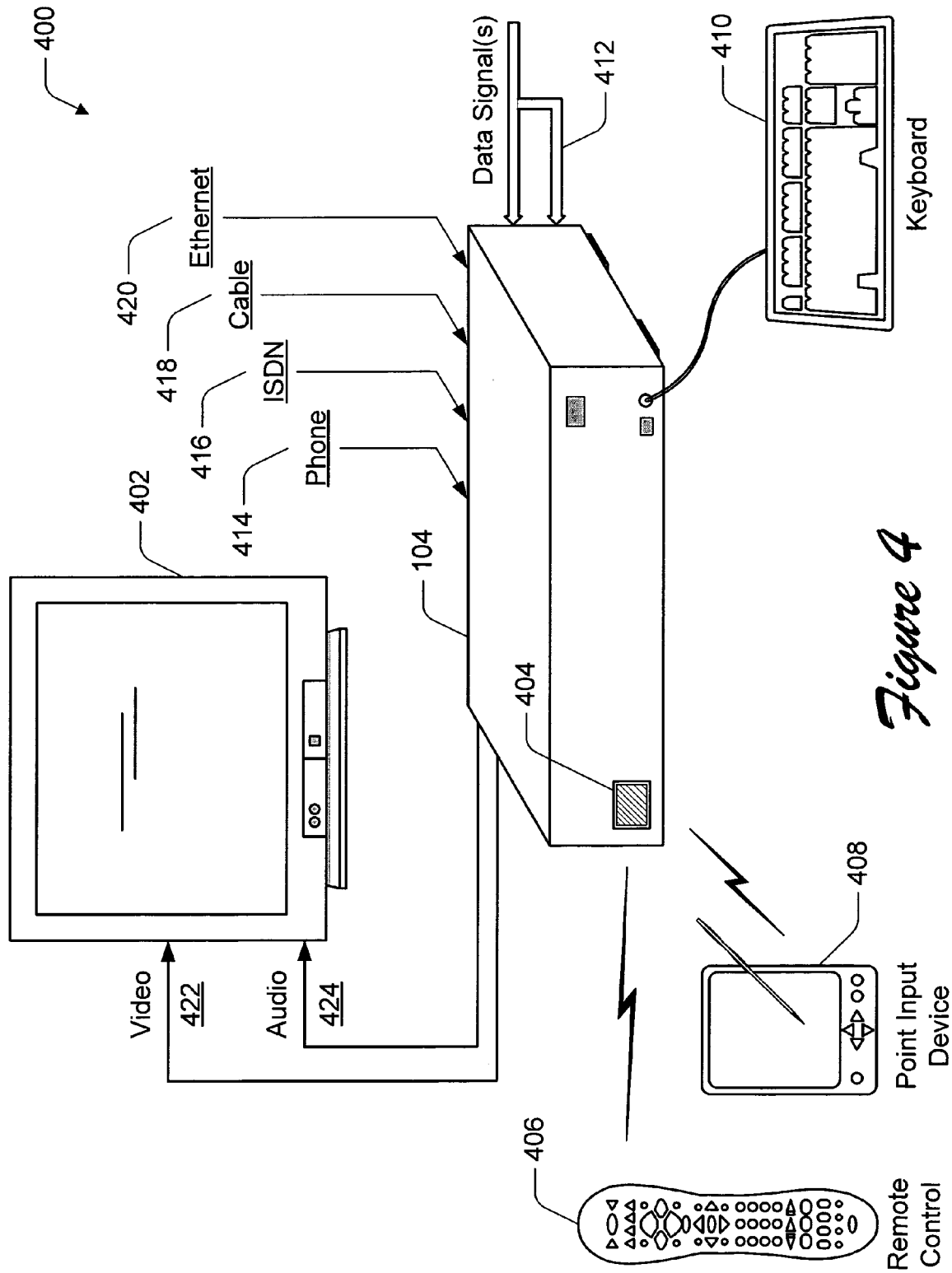
FIG. 4 is a pictorial diagram that illustrates an exemplary implementation of a client device shown as a standalone unit that connects to a television.

FIG. 4 illustrates an exemplary implementation 400 of a client device 104 shown as a standalone unit that connects to a television 402. Client device 104 can be implemented in any number of embodiments, including as a set-top box, a satellite receiver, a TV recorder with a hard disk, a personal computer, and so forth. Client device 104 includes a wireless receiving port 404, such as an infrared (IR) or Bluetooth wireless port, for receiving wireless communications from a remote control device 406, a handheld input device 408, or any other wireless device, such as a wireless keyboard. Handheld input device 408 can be a personal digital assistant (PDA), handheld computer, wireless phone, or the like. Additionally, a wired keyboard 410 is coupled to communicate with the client device 104. In alternate embodiments, remote control device 406, handheld device 408, and/or keyboard 410 may use an RF communication link or other mode of transmission to communicate with client device 104.

Client device 104 receives one or more data signals 410 from one or more broadcast sources, such as from a satellite, the Internet, or a broadcast network. Client device 104 includes hardware and/or software for receiving and decoding data signal 412, such as an NTSC, PAL, SECAM or other TV system video signal. Client device 104 also includes hardware and/or software for providing the user with a graphical user interface by which the user can, for example, access various network services, configure the client device 104, and perform other functions.

Client device 104 is capable of communicating with other devices via one or more connections including a conventional telephone link 414, an ISDN link 416, a cable link 418, and an Ethernet link 420. Client device 104 may use any one or more of the various communication links 414-420 at a particular instant to communicate with any number of other devices.

Client device 104 generates video signal(s) 422 and audio signal(s) 424, both of which are communicated to television 402. The video signals and audio signals can be communicated from client device 104 to television 402 via an RF (radio frequency) link, S-video link, composite video link, component video link, or other communication link. Although not shown in FIG. 4, client device 104 may include one or more lights or other indicators identifying the current status of the device. Additionally, the client device may include one or more control buttons, switches, or other selectable controls for controlling operation of the device.

Figure 5:
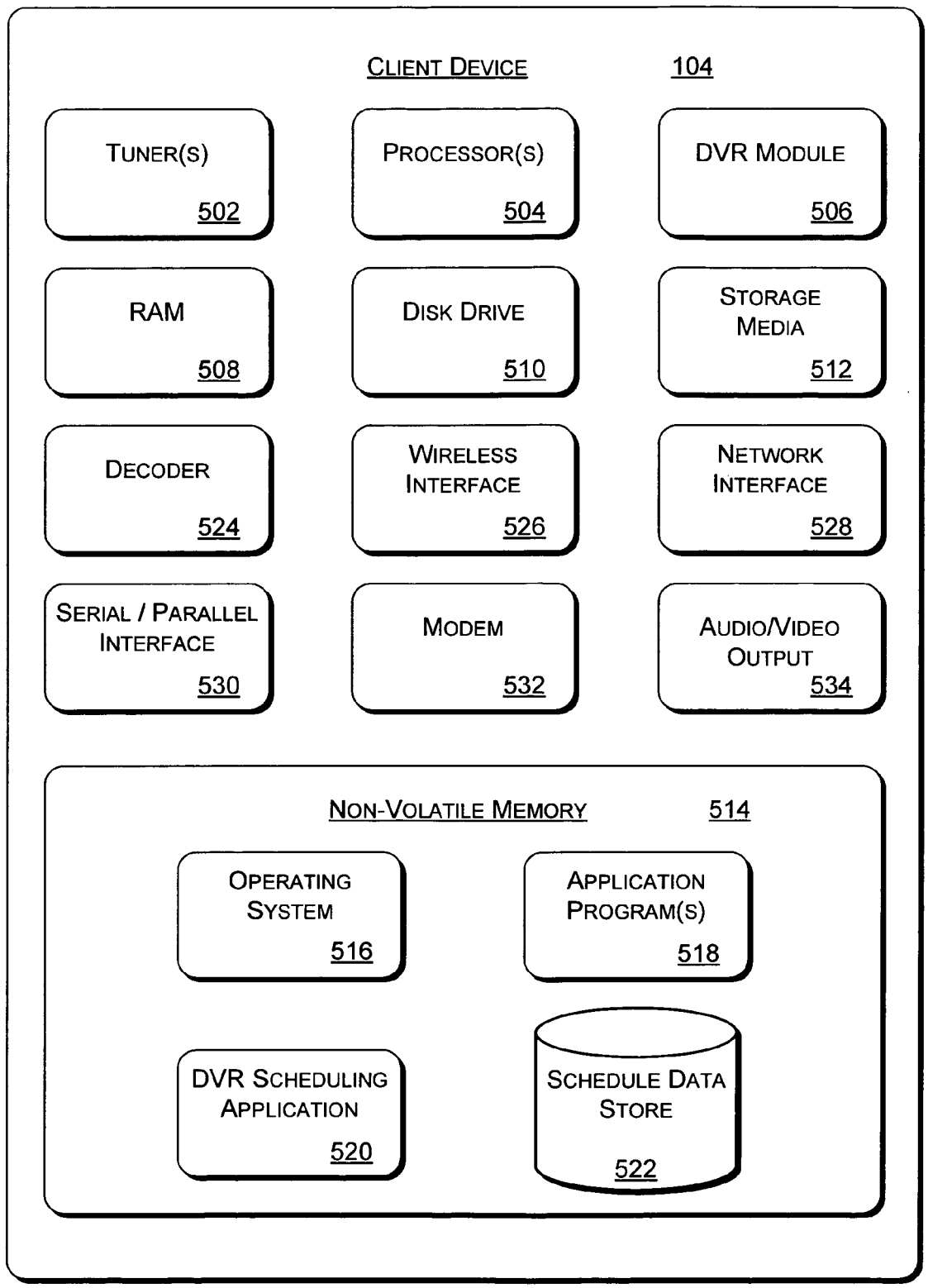
FIG. 5 is a block diagram that illustrates selected components of a client device configured to support phone-based remote media system interaction.

FIG. 5 illustrates selected components of client device 104 shown in FIGS. 1, 2, and 4. Client device 104 includes one or more tuners 502. Tuners 502 are representative of one or more in-band tuners that tune to various frequencies or channels to receive television signals, as well as an out-of-band tuner that tunes to the broadcast channel over which the EPG data is broadcast to client device 104. Tuners 502 may receive data via traditional broadcast channels or via virtual channels such as may be implemented using an IP-based network or other type of network configuration.

Client device 104 also includes one or more processors 504, one or more memory components, and digital video recorder (DVR) module 506. Examples of possible memory components include a random access memory (RAM) 508, a disk drive 510, a mass storage component 512, and a non-volatile memory 514 (e.g., ROM, Flash, EPROM, EEPROM, etc.). Alternative implementations of client device 104 can include a range of processing and memory capabilities, and may include more or fewer types of memory components than those illustrated in FIG. 5.

Processor(s) 504 process various instructions to control the operation of client device 104 and to communicate with other electronic and computing devices. The memory components (e.g., RAM 508, disk drive 510, storage media 512, and non-volatile memory 514) store various information and/or data such as media content, EPG data, configuration information for client device 104, and/or graphical user interface information. DVR module 506 is configured to provide digital recording capabilities.

An operating system 516, one or more application programs 518, DVR scheduling application 520, and schedule data store 522 may be stored in non-volatile memory 514 and executed on processor 504. DVR scheduling application 520 is configured to control DVR module 506. For example, DVR scheduling application 520 may provide an on-screen user interface through which a user may schedule programs to be recorded, manage recorded programs, select recorded programs for viewing, and so on. DVR scheduling application 520 may also provide an interface through which control commands may be received via media network 106 from content distribution system 102. Schedule data store 522 is configured to maintain data that identifies programs that have been recorded and/or are scheduled to be recorded by DVR module 506.

In an alternate implementation, client device 104 may not physically house DVR module 506, but rather may be configured to communicate with another device configured to provide the DVR capabilities. For example, DVR module 506 may be implemented as a component of a server system, such as content distribution system 102. Alternatively, DVR module 506 may be implemented as part of a personal computer system configured to communicate with client device 104. Regardless of where DVR module 506 is physically implemented, media content recorded by DVR module 506 is accessible to client device 104 via a data path.

Client device 104 can also include other components pertaining to a television entertainment system which are not illustrated in this example for simplicity purposes. For instance, client device 104 can include a user interface application and user interface lights, buttons, controls, etc. to facilitate viewer interaction with the device.

Client device 104 also includes a decoder 524 to decode a broadcast video signal, such as an NTSC, PAL, SECAM or other TV system video signal. Client device 104 further includes a wireless interface 526, a network interface 528, a serial and/or parallel interface 530, and a modem 532. Wireless interface 526 allows client device 104 to receive input commands and other information from a user-operated input device, such as from a remote control device or from another IR, Bluetooth, or similar RF input device.

Network interface 528 and serial and/or parallel interface 530 allows client device 104 to interact and communicate with other electronic and computing devices via various communication links. Although not shown, client device 104 may also include other types of data communication interfaces to communicate with other devices. Modem 532 facilitates communication between client device 104 and other electronic and computing devices via a conventional telephone line.

Client device 104 also includes audio/video output 534 that provides signals to a television or other device that processes and/or presents or otherwise renders the audio and video data. Although shown separately, some of the components of client device 104 may be implemented in an application specific integrated circuit (ASIC). Additionally, a system bus (not shown) typically connects the various components within client device 104. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Methods for phone-based remote media system interaction may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

FIGS. 6-9 illustrate exemplary methods for implementing phone-based remote media system interaction. FIGS. 6-9 are specific examples of phone-based remote media system interaction, and are not to be construed as limitations. Furthermore, it is recognized that various embodiments of phone-based remote media system interaction may implement any combination of the methods illustrated in FIGS. 6-9 or any combination of portions of the methods illustrated in FIGS. 6-9.

Figure 6:
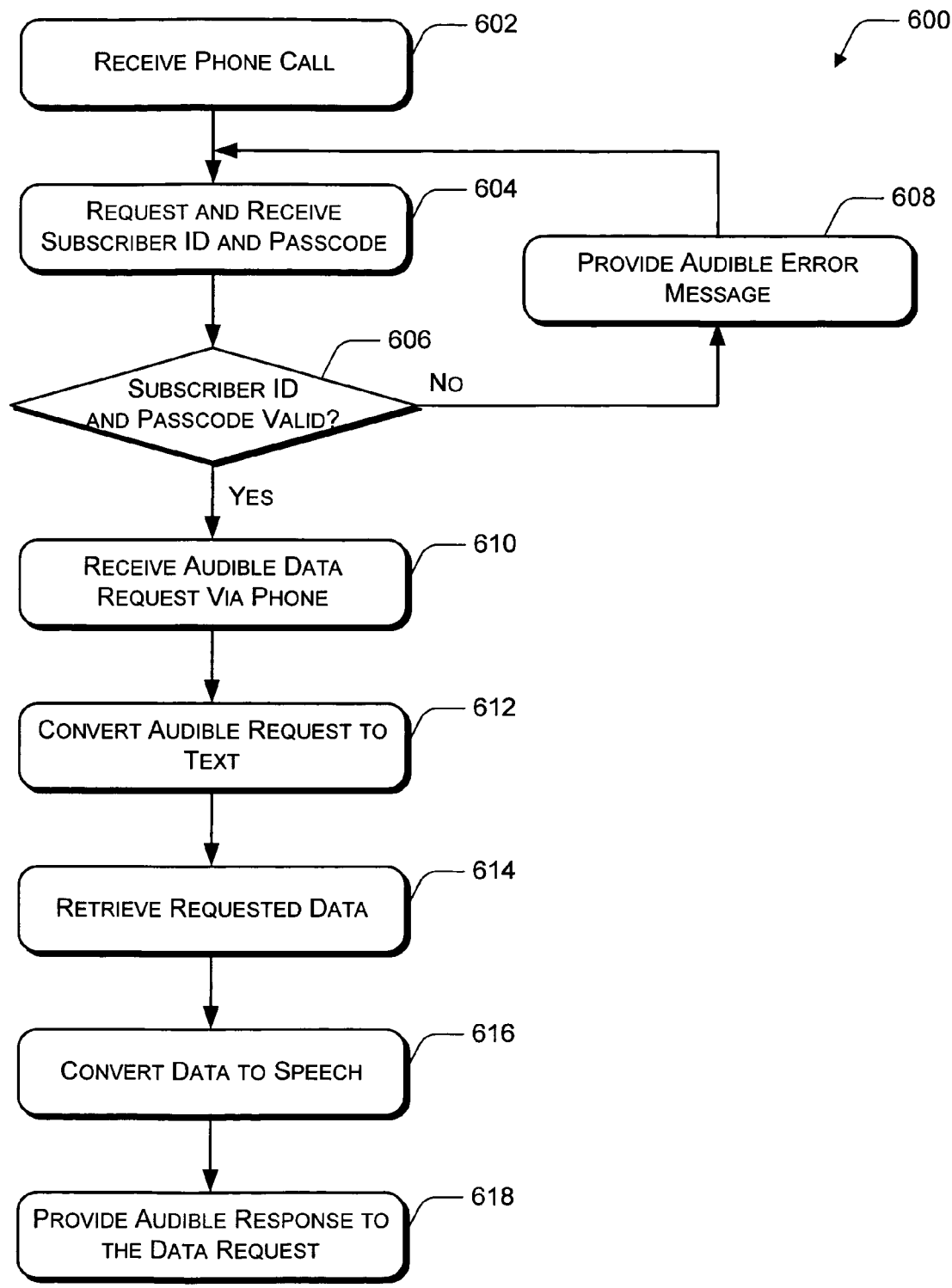
FIG. 6 is a flow diagram that illustrates an exemplary method for using phone-based remote media system interaction to access data.

FIG. 6 illustrates an exemplary method 600 for using an embodiment of phone-based remote media system interaction to retrieve data. The order in which the method is described is not intended to be construed as a limitation, and any number of the described method blocks can be combined in any order to implement the method. Furthermore, the method can be implemented in any suitable hardware, software, firmware, or combination thereof.

At block 602, a server receives a phone call from a caller.

At block 604, the server requests and receives from the caller, a subscriber identifier and a passcode. For example, a voice menu system 318 may request that the caller enter a subscriber ID, which may be entered by touchtone or voice via a telephone. The voice menu system 318 may then request that the caller enter a passcode, which may also be entered by touchtone or voice via the telephone.

At block 606, the server determines whether the entered subscriber ID and passcode are valid. For example, referring to FIG. 3, touchtone interpreter 330 or voice recognition application 332 converts the received data (either touchtone or voice) to text. Voice menu system 318 then queries subscriber data store 320 to verify that the received subscriber ID matches a valid system subscriber and that the received passcode is a valid passcode for the identified subscriber.

If it is determined that the received subscriber ID and/or passcode is not valid (the "No" branch from block 606), then at block 608, the voice menu system provides an audible error message to the caller. The caller may then be asked to re-enter the subscriber ID and/or passcode, as described above with reference to block 604.

If it is determined that the received subscriber ID and passcode are valid (the "Yes" branch from block 606), then at block 610, voice menu system 318 receives an audible data request from the caller. For example, the voice menu system 318 may provide a menu with which the caller may interact with voice and/or touchtone entries via a telephone. The menu system may enable the caller to request various types of data (e.g., a list of programs scheduled for broadcast at a particular time, a list of programs currently scheduled to be recorded by the caller's digital video recorder, an amount of recording space available to the caller's digital video recorder, a list of programs that meet a particular search criteria, and so on.)

At block 612, voice menu system 320 converts the received audible data request into text. For example, if entered as a touchtone response to a menu item, touchtone interpreter 330 converts the touchtone data to a corresponding text value. If entered as a voice response to a menu item, voice recognition application 332 converts the voice data to a corresponding text value.

At block 614, the server retrieves the requested data. For example, if the caller requested data associated with one or more upcoming program broadcasts, then voice menu system 318 may provide the received data request to EPG search engine interface 322, which then queries EPG data store 316. As another example, if the caller requested data associated with the caller's digital video recorder (e.g., a list of programs scheduled to be recorded), then voice menu system 318 may query schedule data store 324.

At block 616, the server converts the requested data from a text format to a speech format. For example, text-to-speech application 312 converts data retrieved from EPG data store 316 or schedule data store 324 to an audible format.

At block 618, the server provides an audible response to the caller's data request.

Figure 7:
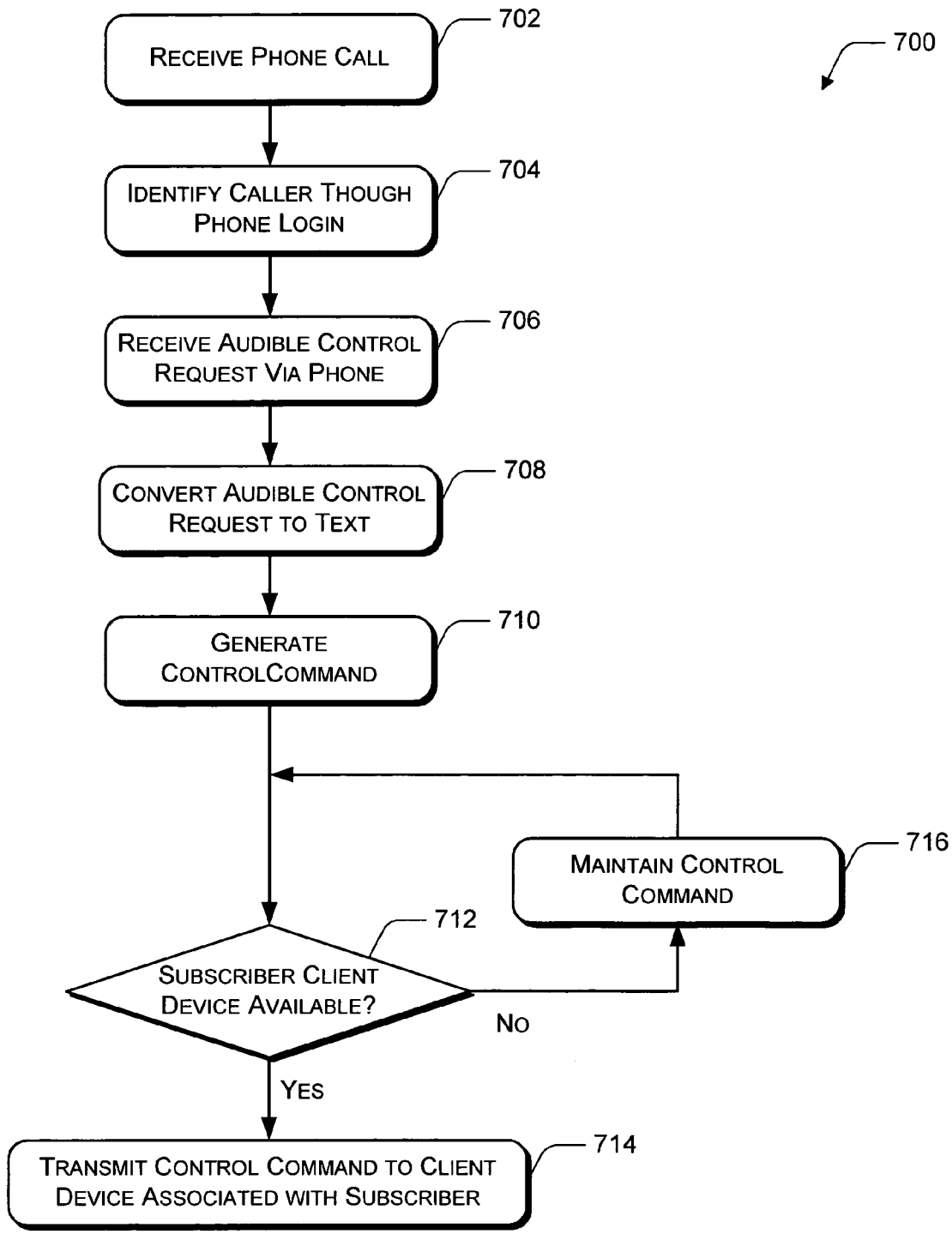
FIG. 7 is a flow diagram that illustrates an exemplary method for using phone-based remote media system interaction to enter a control command.

FIG. 7 illustrates an exemplary method 700 for using an embodiment of phone-based remote media system interaction to enter a media system control command. The order in which the method is described is not intended to be construed as a limitation, and any number of the described method blocks can be combined in any order to implement the method. Furthermore, the method can be implemented in any suitable hardware, software, firmware, or combination thereof.

At block 702, a server receives a phone call from a caller.

At block 704, the server identifies a subscriber account associated with the caller based, for example, on a subscriber ID and passcode entered by the caller. An example of such subscriber identification/validation is described above with reference to blocks 604-608 of FIG. 6.

At block 706, the server receives an audible control request from the caller. For example, referring to FIG. 3, voice menu system 318 may provide a menu with which the caller may interact with voice and/or touchtone entries. The menu system may enable the caller to request that a particular program that is scheduled for broadcast or is otherwise available (e.g., pay-per-view) be scheduled to be recorded.

At block 708, the server converts the received audible control request into text. For example, if entered as a touchtone response to a menu item, touchtone interpreter 330 converts the touchtone record request to a corresponding text value. If entered as a voice response to a menu item, voice recognition application 332 converts the voice record request to a corresponding text value.

At block 710, the server generates a control command. For example, the server uses the text value generated from the audible record request to generate a data packet that includes instructions to a client device to schedule a selected program to be recorded. The generated record command may then be stored in pending notifications store 328.

At block 712, the server determines whether or not a client device associated with the identified subscriber account is available. For example, the server may ping the client device.

If it is determined that the client device is available (the "Yes" branch from block 712), then at block 714, the server transmits the generated control command to the client device. For example, notification engine 328 identifies the record command in pending notification store 326 and transmits the record command to the client device via a network 106.

If it is determined that the client device is not available (the "No" branch from block 712), then at block 716, the server maintains the generated control command. For example, the record command may be stored in pending notifications store 326. Processing then continues as described above with reference to block 712, with the server determining whether or not the client device is available.

Figure 8:
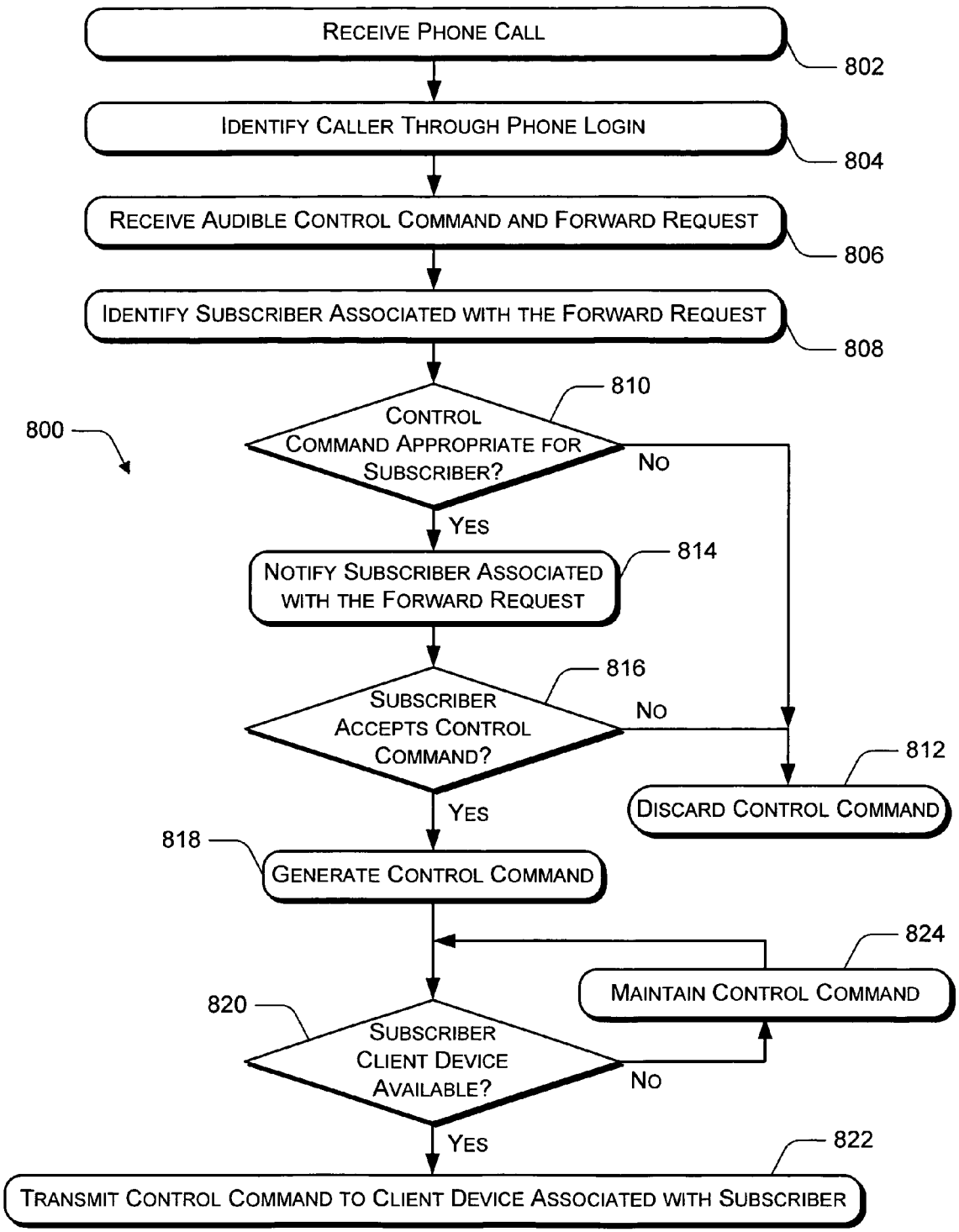
FIG. 8 is a flow diagram that illustrates an exemplary method for using phone-based remote media system interaction to forward a control command.

FIG. 8 illustrates an exemplary method 800 for using an embodiment of phone-based remote media system interaction to forward a control command to another subscriber. The order in which the method is described is not intended to be construed as a limitation, and any number of the described method blocks can be combined in any order to implement the method. Furthermore, the method can be implemented in any suitable hardware, software, firmware, or combination thereof.

At block 802, a server receives a phone call from a caller.

At block 804, the server identifies a subscriber account associated with the caller based, for example, on a subscriber ID and passcode entered by the caller. An example of such subscriber identification/validation is described above with reference to blocks 604-608 of FIG. 6.

At block 806, the server receives an audible control command and forward request from the caller. For example, referring to FIG. 3, voice menu system 318 may provide a menu with which the caller may interact with voice and/or touchtone entries via a telephone. The menu system may enable the caller to request that a particular program that is scheduled for broadcast or is otherwise available (e.g., pay-per-view) be scheduled to be recorded, and indicate another subscriber ID to who's account the record command should be forwarded. For example, a particular subscriber may access the voice menu system, and identify a program that he thinks his friend would be interested in. The caller can identify the friend, and request that the program be scheduled to be recorded by the friend's media system.

At block 808, the server identifies a subscriber associated with the forward request. For example, voice menu system 318 may interact with subscriber data store 320 to identify data associated with a subscriber ID submitted by the caller.

At block 810, the server determines whether or not the requested control command is appropriate for the identified subscriber. For example, if the control command specifies a program to be recorded, the server may query schedule data store 324 based on the subscriber ID associated with the identified subscriber to determine whether or not the subscriber's client device is already programmed to record the identified program.

If the requested control command is not appropriate for the identified subscriber (the "No" branch from block 810), then at block 812, the server discards the received control command and forward request. On the other hand, if the requested control command is appropriate for the identified subscriber (the "Yes" branch from block 810), then at block 814, the server notifies the identified subscriber of the caller's request to forward a control command to the subscriber's client device. For example, depending on preferences set by the subscriber, a message may be left in a voice mailbox that can be accessed by the subscriber, an automated phone call may be placed to the subscriber, an email message may be sent to the subscriber, or any other type of notification may be initiated.

At block 816, the server determines whether or not the subscriber has accepted the forwarded control command. For example, the notification that is sent to the subscriber may include reply instructions that enable the subscriber to reply to the server to either accept or decline the control command. If the subscriber declines the record request (the "No" branch from block 816), the server discards the received control command and forward request, as represented by block 812.

On the other hand, if the subscriber accepts the forwarded control command (the "Yes" branch from block 816), then at block 818, the server generates a control command based on the request. For example, the server generates a data packet that includes instructions to a client device associated with the subscriber to schedule the selected program to be recorded. The generated control command may then be stored in pending notifications store 326.

At block 820, the server determines whether or not a client device associated with the identified subscriber account is available. For example, the server may ping the client device.

If it is determined that the client device is available (the "Yes" branch from block 820), then at block 822, the server transmits the generated control command to the client device. For example, notification engine 328 identifies the record command in pending notification store 326 and transmits the record command to the client device via a network 106.

If it is determined that the client device is not available (the "No" branch from block 820), then at block 824, the server maintains the generated control command. For example, the generated record command is stored in pending notifications store 326. Processing then continues as described above with reference to block 820, with the notification engine 326 determining whether or not the client device is available. As an example, a client device may be unavailable if power to the client device is disrupted or if a network error is hindering communication between the server and the client device.

Figure 9:
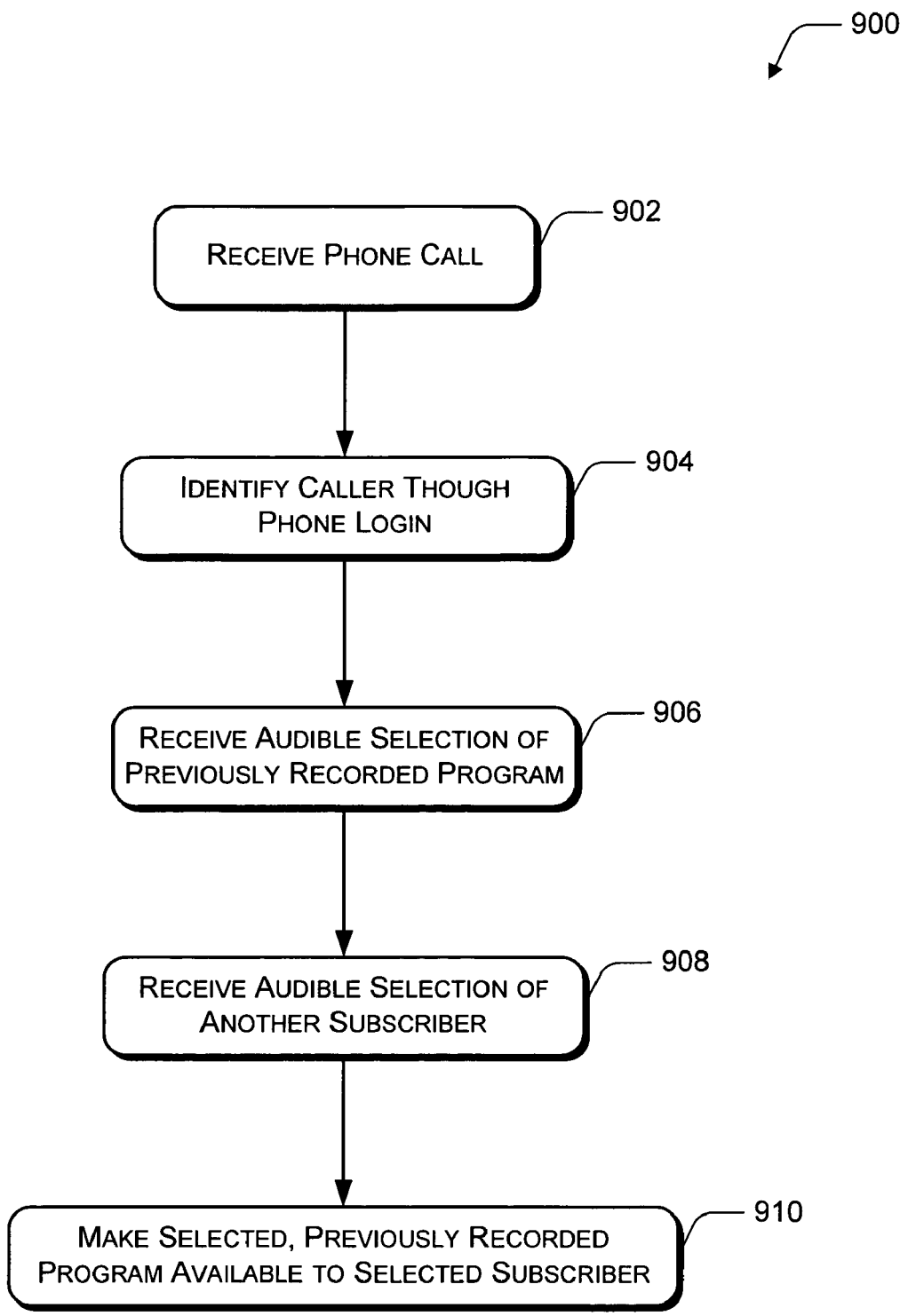
FIG. 9 is a flow diagram that illustrates an exemplary method for using phone-based remote media system interaction to provide another subscriber access to a previously recorded program.

FIG. 9 illustrates an exemplary method 900 for using an embodiment of phone-based remote media system interaction to forward a previously recorded program to another subscriber. The order in which the method is described is not intended to be construed as a limitation, and any number of the described method blocks can be combined in any order to implement the method. Furthermore, the method can be implemented in any suitable hardware, software, firmware, or combination thereof.

At block 902, a server receives a phone call from a caller.

At block 904, the server identifies a subscriber account associated with the caller based, for example, on a subscriber ID and passcode entered by the caller. An example of such subscriber identification/validation is described above with reference to blocks 604-608 of FIG. 6.

At block 906, the server receives an audible selection of a previously recorded program. For example, referring to FIG. 3, voice menu system 318 may provide a menu with which the caller may interact with voice and/or touchtone entries via a telephone. The menu system may enable the caller to select a particular program that has already been recorded by a client device associated with the caller. For example, voice menu system 318 may query schedule data store 324 based on a subscriber ID associated with the caller to present a list of previously recorded programs that are available. The caller may then select one of those programs.

At block 908, the server receives an audible selection of another subscriber ID. For example, the caller may enter (via touchtone or voice) a subscriber ID associated with a friend of the caller.

At block 910, the server makes the selected previously recorded program available to the selected subscriber. For example, the previously recorded program may be copied from the caller's client device to a client device associated with the selected subscriber. Alternatively, the client device associated with the selected subscriber may be granted permission to access the previously recorded program directly from the caller's client device. Any number of techniques may exist for making a previously recorded program associated with one client device available to another client device.

Figure 10:
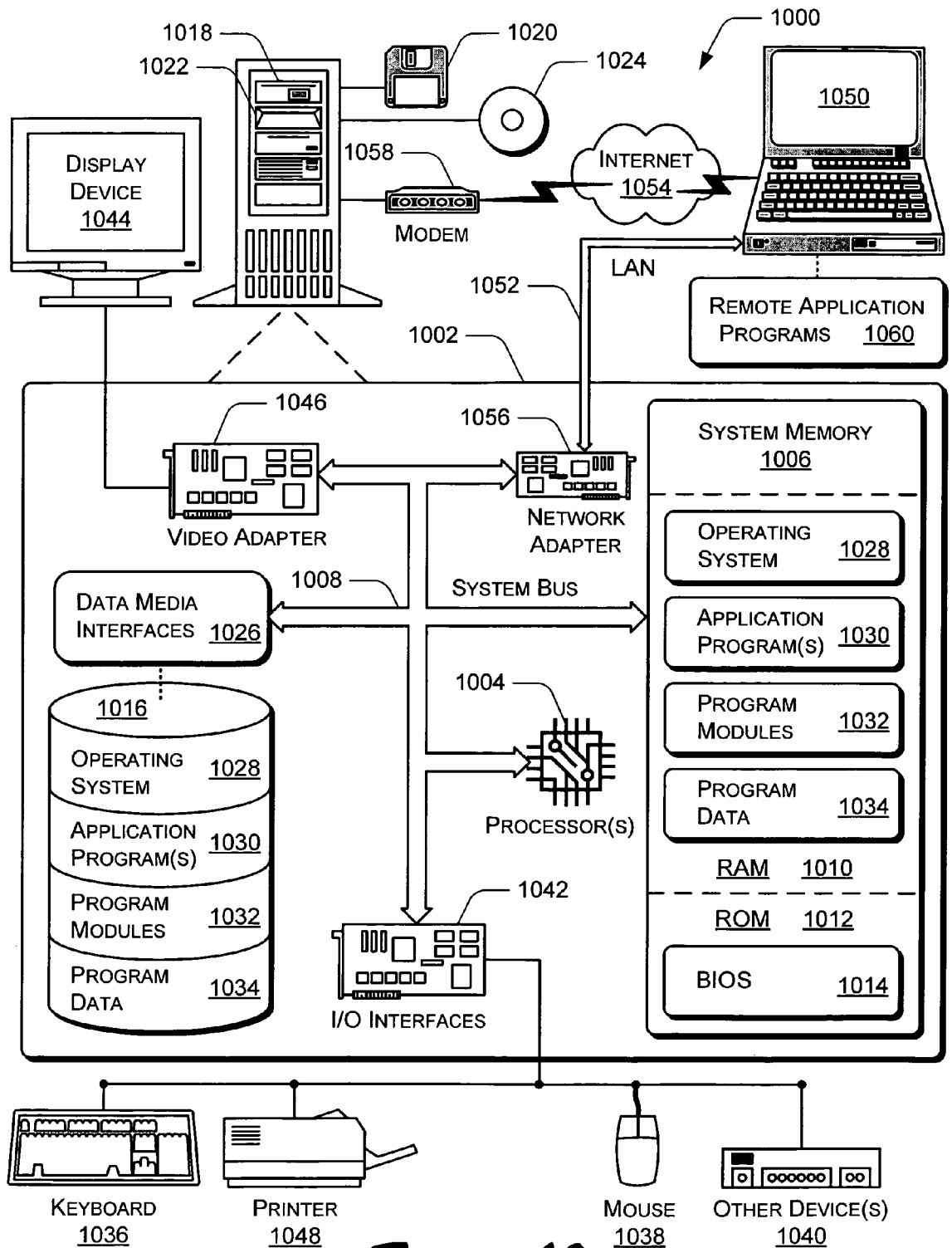
FIG. 10 is a pictorial/block diagram of exemplary computing systems, devices, and components in an environment in which phone-based remote media system interaction may be implemented.

FIG. 10 illustrates an exemplary computing environment 1000 within which phone-based remote media system interaction systems and methods, as well as the computing, network, and system architectures described herein, can be either fully or partially implemented. Exemplary computing environment 1000 is only one example of a computing system and is not intended to suggest any limitation as to the scope of use or functionality of the architectures. Neither should the computing environment 1000 be interpreted as having any dependency or requirement relating to any one or combination of components illustrated in the exemplary computing environment 1000.

The computer and network architectures in computing environment 1000 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 1000 includes a general-purpose computing system in the form of a computing device 1002. The components of computing device 1002 can include, but are not limited to, one or more processors 1004 (e.g., any of microprocessors, controllers, and the like), a system memory 1006, and a system bus 1008 that couples the various system components. The one or more processors 1004 process various computer executable instructions to control the operation of computing device 1002 and to communicate with other electronic and computing devices. The system bus 1008 represents any number of several types of bus structures, including a memory bus or memory controller, a peripheral bus, an accelerated graphics port, and a processor or local bus using any of a variety of bus architectures.

Computing environment 1000 includes a variety of computer readable media which can be any media that is accessible by computing device 1002 and includes both volatile and non-volatile media, removable and non-removable media. The system memory 1006 includes computer readable media in the form of volatile memory, such as random access memory (RAM) 1010, and/or non-volatile memory, such as read only memory (ROM) 1012. A basic input/output system (BIOS) 1014 maintains the basic routines that facilitate information transfer between components within computing device 1002, such as during start-up, and is stored in ROM 1012. RAM 1010 typically contains data and/or program modules that are immediately accessible to and/or presently operated on by one or more of the processors 1004.

Computing device 1002 may include other removable/non-removable, volatile/non-volatile computer storage media. By way of example, a hard disk drive 1016 reads from and writes to a non-removable, non-volatile magnetic media (not shown), a magnetic disk drive 1018 reads from and writes to a removable, non-volatile magnetic disk 1020 (e.g., a "floppy disk"), and an optical disk drive 1022 reads from and/or writes to a removable, non-volatile optical disk 1024 such as a CD-ROM, digital versatile disk (DVD), or any other type of optical media. In this example, the hard disk drive 1016, magnetic disk drive 1018, and optical disk drive 1022 are each connected to the system bus 1008 by one or more data media interfaces 1026. The disk drives and associated computer readable media provide non-volatile storage of computer readable instructions, data structures, program modules, and other data for computing device 1002.

Any number of program modules can be stored on RAM 1010, ROM 1012, hard disk 1016, magnetic disk 1020, and/or optical disk 1024, including by way of example, an operating system 1028, one or more application programs 1030, other program modules 1032, and program data 1034. Each of such operating system 1028, application program(s) 1030, other program modules 1032, program data 1034, or any combination thereof, may include one or more embodiments of the phone-based remote media system interaction systems and methods described herein.

Computing device 1002 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 1002 via any number of different input devices such as a keyboard 1036 and pointing device 1038 (e.g., a "mouse"). Other input devices 1040 (not shown specifically) may include a microphone, joystick, game pad, controller, satellite dish, serial port, scanner, and/or the like. These and other input devices are connected to the processors 1004 via input/output interfaces 1042 that are coupled to the system bus 1008, but may be connected by other interface and bus structures, such as a parallel port, game port, and/or a universal serial bus (USB).

A display device 1044 (or other type of monitor) can be connected to the system bus 1008 via an interface, such as a video adapter 1046. In addition to the display device 1044, other output peripheral devices can include components such as speakers (not shown) and a printer 1048 which can be connected to computing device 1002 via the input/output interfaces 1042.

Computing device 1002 can operate in a networked environment using logical connections to one or more remote computers, such as remote computing device 1050. By way of example, remote computing device 1050 can be a personal computer, portable computer, a server, a router, a network computer, a peer device or other common network node, and the like. The remote computing device 1050 is illustrated as a portable computer that can include any number and combination of the different components, elements, and features described herein relative to computing device 1002.

Logical connections between computing device 1002 and the remote computing device 1050 are depicted as a local area network (LAN) 1052 and a general wide area network (WAN) 1054. Such networking environments are commonplace in offices, enterprise-wide computer networks, intranets, and the Internet. When implemented in a LAN networking environment, the computing device 1002 is connected to a local network 1052 via a network interface or adapter 1056. When implemented in a WAN networking environment, the computing device 1002 typically includes a modem 1058 or other means for establishing communications over the wide area network 1054. The modem 1058 can be internal or external to computing device 1002, and can be connected to the system bus 1008 via the input/output interfaces 1042 or other appropriate mechanisms. The illustrated network connections are merely exemplary and other means of establishing communication link(s) between the computing devices 1002 and 1050 can be utilized.

In a networked environment, such as that illustrated with computing environment 1000, program modules depicted relative to the computing device 1002, or portions thereof, may be stored in a remote memory storage device. By way of example, remote application programs 1060 are maintained with a memory device of remote computing device 1050. For purposes of illustration, application programs and other executable program components, such as operating system 1028, are illustrated herein as discrete blocks, although it is recognized that such programs and components reside at various times in different storage components of the computing device 1002, and are executed by the one or more processors 1004 of the computing device 1002.

Although embodiments of phone-based remote media system interaction have been described in language specific to structural features and/or methods, it is to be understood that the subject of the appended claims is not necessarily limited to the specific features or methods described. Rather, the specific features and methods are disclosed as exemplary implementations of phone-based remote media system interaction.

The invention claimed is:

1. A method implemented by an operations center of a content distribution center, the method comprising:
receiving, by the operations center, a caller input via a telephone connection, the caller input specifying a control command for a client device, wherein the client device is located remotely from the operations center; and
communicating, by the operations center, the control command to the client device such that the client device responds to the control command, wherein communicating the control command to the client device comprises:
determining, by the operations center, whether the client device is available;
in an event that the client device is available, transmitting, by the operations center, the control command to the client device; and
in an event that the client device is not available, maintaining, by the operations center, the control command to be transmitted to the client device at a later time.

2. The method as recited in claim 1, wherein the control command comprises a record command, and wherein the client device responds to the control command by scheduling media content specified as part of the record command to be recorded.

3. The method as recited in claim 1, wherein the control command comprises a forward request, the forward request comprising:
a client device control command; and
an identifier associated with a user other than the caller, the user being associated with the client device to which the media system control command is to be communicated.

4. The method as recited in claim 3, further comprising:
the operations center providing a user notification of the forward request;
the operations center receiving an indication of user acceptance of the forward request; and
in response to receiving the indication of user acceptance, the operations center transmitting the client device control command to the client device associated with the user.

5. The method as recited in claim 1, wherein the control command comprises a forward request, the forward request comprising:
a program identifier associated with media content previously recorded in association with the client device, which is associated with the caller; and
an identifier associated with a user other than the caller, the user associated with another client device to which the media content is to be made available.

6. The method as recited in claim 5, wherein the client device associated with the caller responds to the control command by allowing the client device that is associated with the user access to the media content.

7. The method as recited in claim 6, wherein allowing the client device that is associated with the user access to the media content comprises communicating a copy of the media content from the media system associated with the caller to the remote media system associated with the user.

8. The method as recited in claim 1, further comprising:
receiving, by the operations center, a second caller input via the telephone connection, the second caller input specifying a request for data maintained by the client device;
the operations center retrieving the requested data from the client device;
the operations center converting the data that is received to an audible format; and
the operations center transmitting the data in the audible format via the telephone connection to the caller.

9. The method as recited in claim 8, wherein the data that is requested comprises a listing of previously recorded media content maintained by the client device.

10. The method as recited in claim 8, wherein the data that is requested comprises a listing of media content that is scheduled to be recorded in association with the client device.

11. The method as recited in claim 1, wherein communicating the control command to the client device further comprises:
- a voice menu system interacting with the content distribution system via the telephone network; and
- a notification engine transmitting a control command received from the user via the telephone network to the particular client device via the media network, the control command to be executed by the particular client device.

12. A voice system comprising:
a plurality of remotely located client devices; and
a content distribution system, remotely located in relation to the client devices, the content distribution system comprising:
- a telephone network, wherein a user being associated with a particular client device of the plurality of remotely located client devices can interact with the client device;
- a voice menu system configured to enable audible interaction between the user and the content distribution system via the telephone network; and
- a notification engine configured to transmit a control command received from the user via the telephone network to the particular client device via the media network, the control command to be executed by the particular client device.

13. The system as recited in claim 12, further comprising:
a client device configured to access media content managed by the particular client device and present the media content for consumption by a user, wherein the particular client device is implemented as a component of the content distribution system, and wherein the particular client device is configured to provide digital video recording capabilities in association with the client device.

14. The system as recited in claim 12 wherein the content distribution system further comprises a pending notifications store configured to maintain a control command to be communicated to the particular client device.

15. The system as recited in claim 12, wherein the content distribution system identifies a second client device associated with a user other than the caller to whom the control command is to be forwarded, the second client device being remote to the operations center.

16. One or more computer storage media comprising computer-readable instructions that, when executed, cause a computer system to perform a method, the method comprising:
receiving by an operations center, a control command from a caller via a telephone network;
the operations center identifying a first client device, wherein the first client device is:
remote to the operations center; and
associated with the caller;
the operations center further identifying a second client device to which the control command is to be forwarded, wherein the second client device is:
associated with a user other than the caller; and
remote to the operations center; and
the operations center communicating the control command to the second client device via a media network, causing the second client device to respond to the control command.

17. The one or more computer storage media as recited in claim 16, wherein the first client device is associated with the caller.

18. The one or more computer storage media as recited in claim 16, the method further comprising:
the operations center transmitting a user notification regarding the control command to the second client device; and
the operations center receiving an indication of user acceptance of the control command prior to communicating the control command to the second client device.

19. The one or more computer storage media as recited in claim 16, the method further comprising:
the operations center receiving a forward command from the caller via the telephone network, the forward command specifying:
previously recorded media content associated with the first client device; and
the user other than the caller, the user other than the caller being associated with the second client device to which the previously recorded media content is to be forwarded;
the operations center communicating the forward command to the first client device, causing the first client device to forward the previously recorded media content to the second client device.

20. The one or more computer storage media as recited in claim 16, wherein the operations center communication of the control command to the second client device comprises:
the operations center determining whether the second client device is available;
in an event that the second client device is available, transmitting, by the operations center, the control command to the second client device; and
in an event that the second client device is not available, maintaining, by the operations center, the control command to be transmitted to the second client device at a later time.

* * * * *